United States Patent
Gustafsson

[11] 4,041,724
[45] Aug. 16, 1977

[54] INSTALLATION FOR HEATING A FLUID, PREFERABLY WATER, IN A CONVENTIONAL CENTRAL HEATING SYSTEM, USING THE WASTE HEAT PRODUCED BY A NUMBER OF REFRIGERATORS

[75] Inventor: Berth Ulrik Gustafsson, Osterskar, Sweden

[73] Assignee: Projectus Industriprodukter AB, Stockholm, Sweden

[21] Appl. No.: 650,730

[22] Filed: Jan. 20, 1976

[30] Foreign Application Priority Data

Feb. 18, 1975 Sweden .............................. 7501806

[51] Int. Cl.² .............................................. F25B 29/00
[52] U.S. Cl. .......................................... 62/175; 62/79; 237/2 B
[58] Field of Search ................. 62/238, 510, 335, 79, 62/175, 196 B; 237/28

[56] References Cited

U.S. PATENT DOCUMENTS

| | | | |
|---|---|---|---|
| 2,680,956 | 6/1954 | Haas | 62/175 |
| 3,017,162 | 1/1962 | Haines et al. | 62/238 X |
| 3,392,541 | 7/1968 | Nussbaum | 62/175 X |

*Primary Examiner*—William E. Wayner
*Attorney, Agent, or Firm*—Burns, Doane, Swecker & Mathis

[57] ABSTRACT

There is provided a heat pump installation for the heating of tap water and for room heating purposes e.g., associated office spaces in large warehouses where a number of refrigerators are operating. The heat pump receives its input heat from the heat liberated by the refrigerators.

In order to protect the refrigerators from the influence of the heat pump, and in order to accomplish a smooth operation of the heat pump, the installation according to this invention exhibits the features, that the evaporator device of the heat pump is arranged in the form of parallel-coupled evaporator units each of which is assigned an expansion valve controlled by the refrigerant pressure at the unit outlet;

that a by-pass line containing a valve which opens when the outlet pressure reduces, is arranged between the high-pressure side of the heat pump compressor and the refrigerant circuit of the heat pump, following the evaporator units;

that another by-pass line with a valve controlled by the pressure or temperature at the inlet side of the compressor, is arranged in parallel with the evaporator units of the heat pump;

and that each evaporator unit of the heat heat pump is arranged in a heat-exchanging relationship with its particular first condensor unit in each condensor device of the refrigerators said condensor devices comprising in each case at least one additional condensor unit for the dissipation of the recidual heat, for example to the outdoor air, a third by-pass line being arranged in parallel with the second condensor unit, and a control means being arranged to control the flow distribution between the condensor units as a function of the desired refrigerant pressure after the condensor device.

5 Claims, 4 Drawing Figures

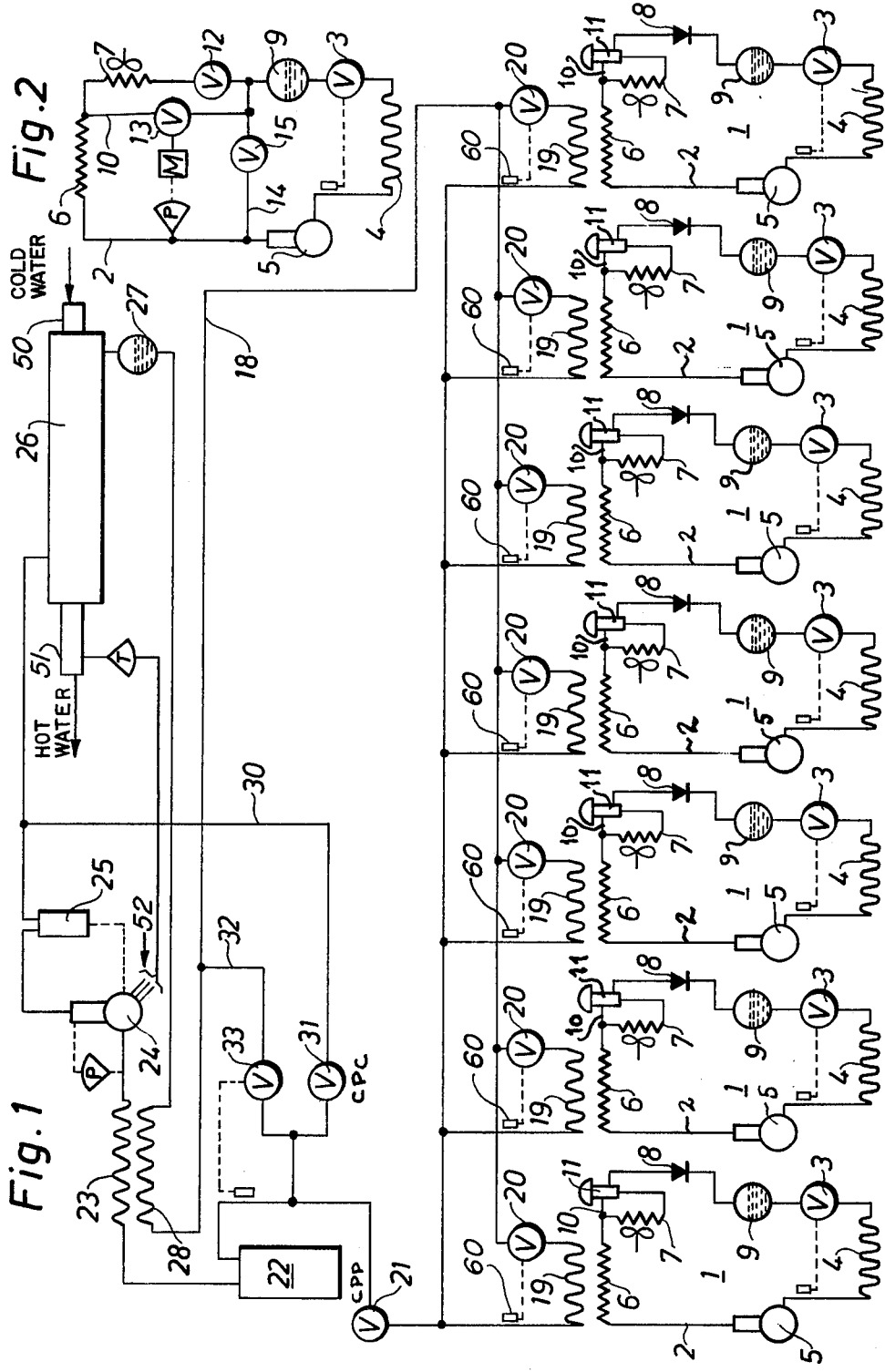

INSTALLATION FOR HEATING A FLUID, PREFERABLY WATER, IN A CONVENTIONAL CENTRAL HEATING SYSTEM, USING THE WASTE HEAT PRODUCED BY A NUMBER OF REFRIGERATORS

The present invention relates to an installation for heating a fluid, preferably water in a conventional central heating system, utilising the waste heat from a number of refrigerators each of which comprises a refrigerant circuit containing, in series, an evaporator, a compressor, a condensor device and an expansion valve, a heat pump, this comprising a refrigerant circuit containing in series an evaporator device with expansion means, a compressor and a condensor, being arranged to receive via its evaporator device, thermal energy from the condensor devices of the refrigerators, and to heat up said fluid by heat exchange at its condensor.

It is well known, for example in large warehouses where a number of refrigerators are operating, to utilise the heat liberated by the refrigerators in order to heat the air in the warehouse.

For tap water supplies, electrical heating and oil-fired heating have been used, and furthermore heat liberated by refrigerators has only been capable of utilisation in the room or rooms in which the refrigerators are installed. Where other spaces associated with these rooms are concerned, for example office spaces, reliance has been placed upon conventional central heating systems.

Normally, the quantity of heat liberated by the refrigerators is sufficient to supply the whole complex (inclusive of offices and the like) as far as space heating and tap water heating are concerned, but hitherto it has not been possible in a suitable fashion to transfer the available heat furnished by the refrigerators, to all the spaces and to desired media and temperature levels.

One of the problems here is that the utilisation of the heat liberated by the refrigerators must not affect the cooling performance of the machines, these latter very often being used to store deep-frozen foodstuffs.

Another problem is that refrigerators operate intermittently and independently of one another so that the total heat flow produced varies rapidly over a period of time with the result that the heat supply varies correspondingly and this means that considerable problems are created from the point of view of control technology.

Accordingly, hitherto only part of the heat liberated by the refrigerators has been utilised, in fact in order to heat the rooms in which the refrigerators are set up, and the surplus heat has been dissipated for example in cooler banks set up outside, for example on the outside of the roofs covering the rooms.

In accordance with the invention these disadvantages are overcome so that the heat liberated via the refrigerators can be utilised to supply heat and hot water to a whole complex of rooms to the extent that the quantity of heat available from the refrigerators is adequate.

In a temperate climate such as that of Sweden, it is considered that the amount of heat liberated by the refrigerators is quite adequate for the said purpose throughout the year, with the possible exception of some isolated days during winter time.

Usually surplus heat has to be dissipated for a major part of the year.

The significant feature of the invention is that the evaporator device of the heat pump is arranged in the form of parallel-coupled evaporator units each of which is assigned an expansion valve controlled by the refrigerant pressure at the unit outlet; that a by-pass line containing a valve which opens when the outlet pressure reduces, is arranged between the high-pressure side of the heat pump compressor and the refrigerant circuit of the heat pump, following the evaporator units; that a second by-pass line with a valve controlled by the pressure or temperature at the inlet side of the compressor, is arranged in parallel with the evaporator units of the heat pump; and that each evaporator unit of the heat pump is arranged in a heat-exchanging relationship with its particular first condensor unit in each refrigerator condensor device, which latter device in each case comprises at least one additional condensor unit for the dissipation of the residual heat, for example its dissipation to the external air, a third by-pass line being arranged in parallel with the second condensor unit, and a control means being provided in order to control the flow distribution between the condensor units as a function of the desired refrigerant pressure after the condensor device. In this connection, the refrigerant leaving the condensor of the heat pump can be arranged in a heat-exchanging relationship with the refrigerant leaving the evaporator of the heat pump. The pressure-sensitive means can include a balance valve which by balancing a predetermined pressure and the pressure of the refrigerant after the condensor system, routes the refrigerant flow past the second condensor unit. Alternatively, the pressure-sensitive means can comprise a valve arranged in the third by-pass line, which is controlled by the refrigerant pressure up-stream of the condensor device, a fourth by-pass line disposed in parallel with the condensor device and containing a valve controlled by the refrigerant pressure after the condensor system, and a valve arranged at the outlet of the second condensor unit, which is controlled by the refrigerant pressure in said second condensor unit.

Through the arrangement in accordance with the invention it is thus possible, in an optimum manner, to exploit the heat liberated by the refrigerators and to convert this to a desired temperature level, and in this way it has also been possible to resolve the problems which pertain to the circumstances that the capacity of the refrigerant circuits varies; each circuit is entirely independent of the others; the refrigerant container pressure in the particular circuit must be guaranteed at a certain level; the instantaneous capacity of the heat pump must be matched to the heat consumption in the hot water circuit; the operation of the refrigerators must not affect the functioning of the heat pump; and the cooling capacity of the heat pump must be instantaneously matched to the actual condensor heat supplied, so that the heat pump low pressure must be limited in order that the condensor temperature of the refrigerators does not drop inpermissibly.

The invention will be described in more detail in the following in the form of examples, making reference to the attached drawings in which:

FIG. 1 schematically illustrates a system in accordance with the invention;

FIG. 2 illustrates an alternative refrigerant circuit in an installation in accordance with the invention;

Figure 3:
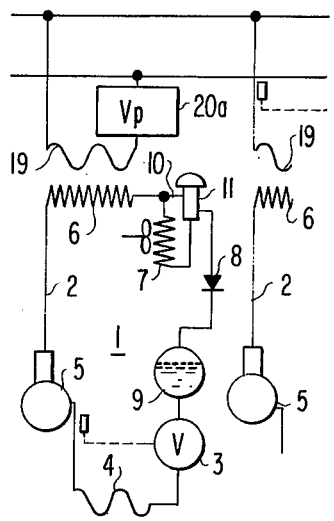
FIG. 3 illustrates an alternative system in which an expansion valve, referred to in greater detail below, is controlled by refrigerant pressure instead of refrigerant temperature, as shown in FIG. 1.

FIG. 1 schematically illustrates a plurality of refrigerators 1 each of which comprises a refrigerant circuit 2 containing in series, an expansion valve 3, an evaporator 4, a compressor 5 two series-connected condensors 6 and 7 respectively, a check valve 8 and a reservoir 9. The condensation temperature at condensor 6 may be around 30° C.

A by-pass line 10 is placed in parallel with the second condensor 7. Connected between the by-pass line 10 and the circuit 2, at the outlet side of the condensor 7, there is a control valve 11 of a type known per se. The valve 11 is a balance valve, which, as a function of the difference between the refrigerant pressure at the condensor outlet, and the external pressure, (for example a spring load or the pressure contained in a gas-bottle) routes the refrigerant around the condensor 7. In this fashion, a specific refrigerant pressure (determined by the external pressure), is maintained in the reservoir 9.

The condensors 7 of the refrigerators 1 are normally arranged close to each other in the form of a bank on the roof of the room in which the installation is located. The bank is normally fan cooled.

Furthermore, FIG. 1 illustrates a heat pump which comprises a refrigerant circuit 18 containing, in series, a plurality of parallel-coupled evaporators 19 each of which is assigned an expansion valve 20, a suction pressure valve 21, a liquid separator 22, a first heat-exchange coil 23, a compressor 24, an oil separator 25 and a condensor 26, a liquid reservoir 27 and a second heat-exchange coil 28 arranged adjacent the coil 23. The expansion valve 20 is controlled by the refrigerant pressure or temperature at the outlet of the evaporator 19, as by means of thermostat 60 shown in FIG. 1 or by pressure-controlled valve 20a, as shown in FIG. 3.

The valve 21 may be referred to as a suction pressure regulator.

Each of the evaporators 19 of the heat pump is arranged in a heat-exchanger relationship with the first condensor 6 of each of the associated refrigerators 1.

Thus, the heat pump receives heat at a predetermined temperature from the first condensor 6 of the refrigerators, when the respective refrigerator is operating. The heat pump circuit 18 may contain the refrigerant R 12.

The heat pump shown in FIG. 1 furthermore comprises a first by-pass line 30 which is arranged between the high pressure side of the circuit and the manifold line from the evaporators 19. The line 30 contains a valve 31 controlled by the pressure in the manifold line.

In addition, the second by-pass line 32 is arranged in parallel with the evaporator systems 19, 20. Said second by-pass line contains a valve 33 which is controlled by the temperature in the manifold line, and which accomplishes a refrigerant injection in circuit 18 at the inlet side of the compressor (c.f. FIG. 1).

The capacity of the compressor 24 can be controlled by the refrigerant pressure at the suction side of the compressor (rpm controlled or on/off controll of cylinders if the compressor is of multi-cylinder design).

The compressor can furthermore be arranged to be switched in and switched out as a function of the temperature of the coolant in the condensor 26. The coolant can be water in a conventional central heating installation.

In the heat pump, it may be possible to dispense with the suction valve 21 if the valve 33 is controlled by the temperature at the inlet of the compressor 24.

FIG. 2 illustrates an alternative embodiment of the refrigerator circuit in which components corresponding to those shown in FIG. 1, have been given the same references.

In order to control the flow through the condensor 7, a valve 12 is arranged after the latter. The valve 12 passes refrigerant if the pressure at inlet side exceeds a predetermined level. The by-pass line 10 contains a valve 13 which throttles with increasing pressure at the inlet side of the condensor 6. Furthermore, a shunt line 14 is arranged between the high pressure side of the compressor 5 and the circuit 2 preceding the reservoir 9. The by-pass line 14 contains a valve 15 which opens if the pressure at its outlet side drops below a specific level. In this fashion, the pressure in the reservoir 9 is maintained within the values which are determined by the valves 12 and 15.

Of the valves referred to, at least some can be chosen from the "danfoss" (Denmark) production range, for example the type CPC being chosen for the valves 15 and 31, the type CPR for the valve 12 and the type CPP for the valve 21.

The apparatus shown in FIG. 1 operates in the following manner:

Each refrigerator 1 works intermittently and independently of the other refrigerators, and furthermore, the operation of each individual refrigerator must neither be disturbed by the heat pump shown in the upper part of FIG. 1 nor by the other refrigerators.

The hot refrigerant leaving the compressor 5 of a refrigerator 1 passes the condenser 6. In each refrigerator there is provided a balance valve 11 which passed the refrigerant to the secondary condenser 7 to the extent this is necessary in order not to disturb the temperature level at the evaporator 4 and in order to remove all the heat absorbed by evaporator 4.

Figure 4:
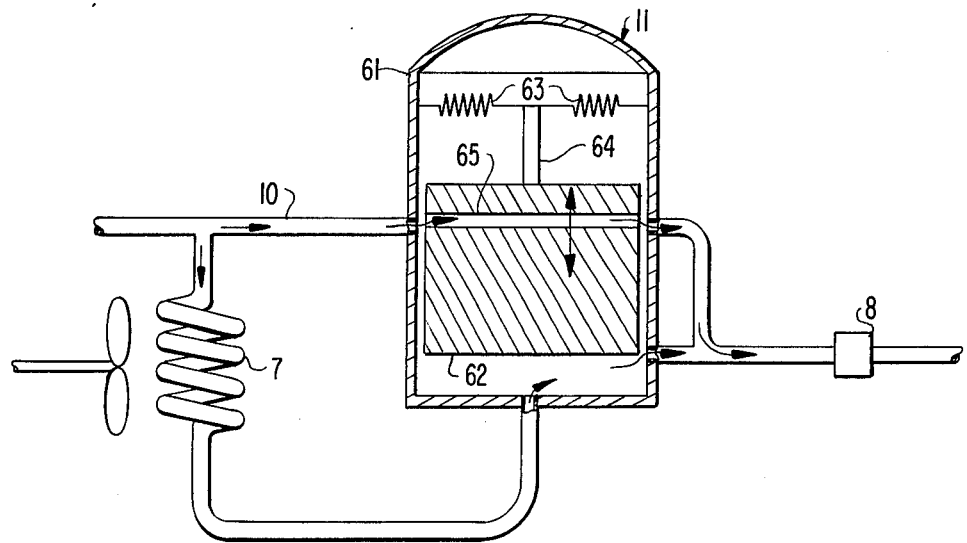
FIG. 4 is a schematic illustration in section of a form of balancing valve referred to in the detailed description of the invention.

Valve 11, as seen from FIG. 4, comprises a housing 61 containing pressurized bellows 63 which acts against one side of a displaceable plunger 62 through rod 64. The other side of the plunger is subjected to the refrigerant pressure at the outlet of condenser 7. If this refrigerant pressure causes a displacement of the plunger toward the bellows the shuntline 10 will be throttled or closed, and at least part of the refrigerant will flow through condenser 7 and through valve 11 toward check-valve 8. If the bellows pressure causes a displacement of the plunger against the refrigerant pressure at the outlet of condenser 7, the outlet of the condenser 7 will be throttled or closed and the valve 11 will let through at least part of the refrigerant flow from shuntline 10 through passage 65 toward the check valve 8. Thus, the preset pressure of the bellows will control the routing of refrigerant through shuntline 10 and condenser 7, respectively, and thereby the refrigerant pressure after valve 11 will be determined by the present bellows pressure. Valve 11 is known per se and is a commercially available device.

Each condenser 6 is arranged to transfer heat to a respective evaporator unit 19 of the heat pump.

The refrigerant vaporized in the heat pump evaporators 19 is transported toward compressor 24 through condenser 26 and then back toward the evaporators 19 through which refrigerant is passed when valve 20 opens in response to a sensed pressure of temperature level, i.e. when there is a heat flow from a condenser 6 to a respective evaporator 19.

The hot refrigerant leaving the compressor 24 and entering condenser 26 is condensed in condenser 26 by heat exchange with a fluid such as water. As shown in FIG. 1, cooling water enters condenser 26 through inlet 50 and leaves as hot water through outlet 51. The element designated by T which is attached to outlet 51 and to the element designated generally as 52, is a thermostat. If the water leaving outlet 51 is too hot, the thermostat operates to acturate a switching mechanism 52 to turn off compressor 24.

The heated water may be circulated in a conventional central heating system and thus be utilized for heating rooms via radiators, as well as for heating tap water.

Alternatively, the coolant passed through condenser 26 may consist of air which after suitable conditioning and mixing with cool air can be distributed to the rooms to be heated.

The heat pump circuit comprises a valve 21 which lets through refrigerant from the manifold line of the heat pump in order to maintain a predetermined pressure at the inlet side of compressor 24.

However, should the pressure in the manifold line momentarily be insufficient to satisfy the desired pressure level on the inlet side of the compressor 24, the valve 31 will open so that refrigerant is passed or "short circuited" via line 30 to the inlet side of the compressor 24. If valve 31 opens, the pressure will rise to the desired value at the inlet side of the compressor 24, but the temperature of the refrigerant at the inlet side of the compressor tends to become too high. Therefore valve 33 will sense the temperature of the refrigerant at the inlet side of the compressor, and, if necessary, inject cold refrigerant via line 32 to the inlet side of the compressor 24.

However, valve 21 may be dispensed with as valves 33 and 31 are capable of maintaining a sufficient pressure level at the inlet side of the compressor.

What is claimed is:

1. An installation for heating a fluid by utilizing the waste heat from a plurality of refrigerators, said installation comprising a plurality of refrigerators in combination with a heat pump, each of said refrigerators comprising a first refrigerant circuit including, in series, a first evaporator, a first compressor, a first condenser device and a first expansion valve, said heat pump comprising a second refrigerant circuit including, in series, a second evaporator device having expansion means, a second compressor and a second condenser, said heat pump being arranged to receive via said second evaporator device, the thermal energy from said first condenser device of the refrigerator, and to heat said fluid by heat exchange at said second condenser, said second evaporator device being arranged in the form of parallel-coupled evaporator units each of which is connected to an expansion valve controlled by the refrigerant temperature at the unit outlet; a first by-pass line including a valve, openable when said unit outlet pressure is reduced, arranged between the high pressure side of said second compressor and said second refrigerant circuit, following said second evaporator device; a second by-pass line having a valve controlled by the temperature at the inlet side of said second compressor, arranged in parallel with said second evaporator units being arranged in a heat exchanging relationship with its particular first condenser device of the refrigerators, said first condenser devices each comprising at least one additional condenser unit for the dissipation of the residual heat, a third by-pass line being arranged in parallel with said additional condenser unit, said third by-pass line having therein control means arranged to control the flow distribution between the condenser units as a function of the desired refrigerant pressure after the condenser device.

2. An installation in accordance with claim 1 wherein an expansion valve controlled by refrigerant pressure is substituted for the expansion valve controlled by refrigerant temperature at the unit outlets of each of the parallel-coupled evaporator units.

3. An installation as claimed in claim 1, wherein the refrigerant leaving the condenser of the heat pump is placed in a heat-exchanging relationship with the refrigerant leaving the evaporator of the heat pump.

4. An installation as claimed in claim 1, wherein one of the control means in the third by-pass line comprises a balance valve which by balancing a predetermined pressure and the refrigerant pressure after the condenser system, routes the refrigerant flow past the second condenser unit.

5. An installation as claimed in claim 1, wherein the remaining control means in the third by-pass line comprise a valve which is controlled by the refrigerant pressure before the first condenser device, a fourth by-pass line which is arranged in parallel with said first condenser device and includes a valve controlled by the refrigerant pressure after said first condenser device, and a valve arranged at the outlet of the additional condenser unit, which is controlled by the refrigerant pressure in said additional condenser unit.

* * * * *